United States Patent
Liu

(10) Patent No.: US 9,047,086 B1
(45) Date of Patent: Jun. 2, 2015

(54) METHOD AND APPARATUS FOR SUPPLYING POWER TO A DEVICE OVER A COMMUNICATION LINK

(75) Inventor: Chen Liu, Shanghai (CN)

(73) Assignee: Marvell International Ltd., Hamilton (BM)

( * ) Notice: Subject to any disclaimer, the term of this patent is extended or adjusted under 35 U.S.C. 154(b) by 263 days.

(21) Appl. No.: 13/416,301

(22) Filed: Mar. 9, 2012

Related U.S. Application Data

(60) Provisional application No. 61/454,908, filed on Mar. 21, 2011.

(51) Int. Cl.
*G06F 1/32* (2006.01)

(52) U.S. Cl.
CPC .............. *G06F 1/325* (2013.01); *G06F 1/3206* (2013.01)

(58) Field of Classification Search
CPC ....... G06F 1/32; G06F 1/3203; G06F 1/3206; G06F 1/3209; G06F 1/3215; G06F 1/3228; G06F 1/3234; G06F 1/325; G06F 1/3284
USPC .................. 713/300, 310, 320, 323–324, 340
See application file for complete search history.

(56) References Cited

U.S. PATENT DOCUMENTS

| | | | | |
|---|---|---|---|---|
| 6,162,078 A | * | 12/2000 | Chung | 439/188 |
| 6,281,457 B1 | * | 8/2001 | Chang | 200/547 |
| 6,317,839 B1 | * | 11/2001 | Wells | 713/320 |
| 2001/0030775 A1 | * | 10/2001 | Suzuki | 358/475 |
| 2002/0162035 A1 | * | 10/2002 | Tsukihashi | 713/300 |
| 2004/0109192 A1 | * | 6/2004 | Nuttall et al. | 358/1.14 |
| 2004/0157638 A1 | * | 8/2004 | Moran et al. | 455/550.1 |
| 2005/0240784 A1 | * | 10/2005 | Sugasawa | 713/300 |
| 2005/0267999 A1 | * | 12/2005 | Suematsu et al. | 710/14 |
| 2009/0082910 A1 | * | 3/2009 | Sato | 700/297 |
| 2010/0073703 A1 | * | 3/2010 | Tamada | 358/1.14 |
| 2010/0246857 A1 | * | 9/2010 | Kajita | 381/120 |
| 2010/0296134 A1 | * | 11/2010 | Yi et al. | 358/474 |
| 2011/0167290 A1 | * | 7/2011 | Yoshimoto et al. | 713/340 |

FOREIGN PATENT DOCUMENTS

JP     2006352255 A   *   12/2006

* cited by examiner

*Primary Examiner* — Thomas J Cleary

(57) ABSTRACT

Embodiments provide a method comprising using a link to couple an electronic device to a host, wherein the electronic device is operable in at least one of a first mode of operation and a second mode of operation; while the electronic device is operating in the first mode of operation, supplying, to a first component of the electronic device, power received from a power source; and while the electronic device is operating in the second mode of operation, (i) supplying, to the first component of the electronic device, power received from the host via the link, and (ii) not supplying, to the first component of the electronic device, power received from the power source.

8 Claims, 3 Drawing Sheets

METHOD AND APPARATUS FOR SUPPLYING POWER TO A DEVICE OVER A COMMUNICATION LINK

CROSS-REFERENCES TO RELATED APPLICATIONS

The present disclosure claims priority to U.S. Provisional Patent Application No. 61/454,908 filed Mar. 21, 2011, the entire disclosure of which is hereby incorporated by reference in its entirety except for those sections, if any, that are inconsistent with this disclosure.

TECHNICAL FIELD

Embodiments of the present disclosure relate to the field of electronic devices, and more particularly, to techniques for supplying power to electronic devices over a communication link.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

A consumer electronic device can be coupled to a host (e.g., a computer) through a Universal Serial Bus (USB) link. The consumer electronic device can receive power from the host through the USB link, which can be used to power one or more operations of the consumer electronic device. However, due to limitations in a maximum amount of power that can be transmitted over a USB link, some consumer electronic devices (e.g., a printer) do not use power that can be received over the USB link.

SUMMARY

In various embodiments, there is provided a method comprising using a link to couple an electronic device to a host, wherein the electronic device is operable in at least one of a first mode of operation and a second mode of operation; while the electronic device is operating in the first mode of operation, supplying, to a first component of the electronic device, power received from a power source; and while the electronic device is operating in the second mode of operation, (i) supplying, to the first component of the electronic device, power received from the host via the link, and (ii) not supplying, to the first component of the electronic device, power received from the power source.

In various embodiments, there is also provided an electronic device operable to be coupled to each of (i) a host via a link and (ii) a power source, the electronic device comprising a first component configured to, (i) while the electronic device is operating in a standard mode of operation, receive power from the power source, (ii) while the electronic device is operating in a low power mode of operation, receive power from the host, and (iii) while the electronic device is operating in the low power mode of operation, not receive power from the power source; and a power control module configured to control power received by the first component.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION

Figure 1:
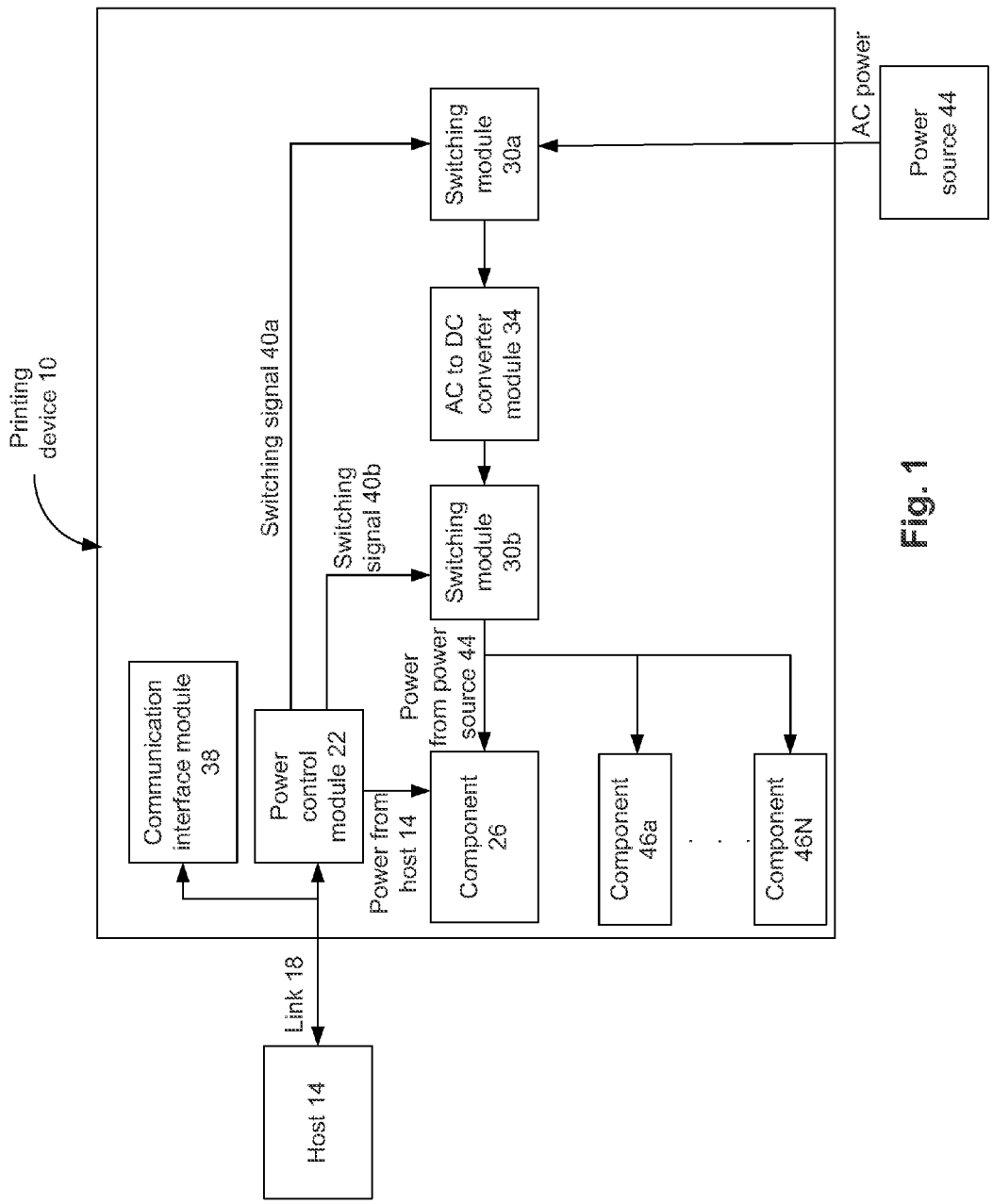
FIG. 1 schematically illustrates an example electronic device coupled to a host.

FIG. 1 schematically illustrates an example electronic device—e.g., a printing device 10—coupled to a host 14. In an embodiment, the printing device 10 is a printer, e.g., a color printer, a monochrome printer, an inkjet printer, a laser printer, a multifunction printer (e.g., which, in addition to printing, performs one or more of scanning, faxing, copying, and/or the like), etc.

The printing device 10 (referred to henceforth as "device 10") is coupled to the host 14 via a link 18. In an embodiment, the host 14 is an appropriate computing device, e.g., a computer, a laptop, a desktop, a mobile computing device, a set-top box, and/or the like. In an embodiment, the host 14 is capable of transmitting power to the device 10 via the link 18. The link 18 is an appropriate communication link to communicate data (e.g., print data) between the host 14 and the device 10, and also to transmit power from the host 14 to the device 10.

As an example, the link 18 is a Universal Serial Bus (USB) link connected to an USB port (not illustrated in FIG. 1) of the host 18. The USB port provides, for example, a 5 volt (V) supply from which the device 10 may draw power. For example, according to the USB 3.0 standard released on November 2008, the device 10 may draw a maximum of 500 miliampers (mA) from the USB port of the host 14, via the USB link 18. As previously discussed, the USB link is also used for communication between the host 14 and the device 10.

In another example, the link 18 is an Ethernet link connected to an Ethernet port (not illustrated in FIG. 1) of the host 14. The Ethernet port of the host 14 provides power to the device 10 using, for example, an appropriate Power over Ethernet (PoE) technology. For example, the Ethernet port of the host 14 provides power to the device 10, via the Ethernet link, in accordance with Institute of Electrical and Electronics Engineers (IEEE) 802.3at standard for Power over Ethernet enhancements, released on 2009. As previously discussed, the Ethernet link is also used for communication between the host 14 and the device 10.

In an embodiment, the device 10 comprises a power control module 22, a component 26, a communication interface module 38, switching modules 30a and 30b, and an alternating current (AC) to direct current (DC) converter module 34. The device 10 also includes several other components, e.g., components 46a, . . . , 46N, where N is an appropriate integer.

The communication interface module 38 is configured to transmit and/or receive data to and/or from the host 14 via the link 18. The transmitted and/or received data includes, for example, data associated with printing, scanning, faxing, copying, and/or other appropriate operations of the device 10. Data transmitted and/or received by the communication interface module 38 are processed by one or more other components of the device 10 (e.g., a print controller, an image processor, a data processor, and/or the like).

The power control module 22 receives power (e.g., DC power) via the link 18 from the host 14, and transmits the DC power to the component 26. The power control module 22 also controls operations of the switching modules 30a and 30b (e.g., controls opening and closing of switches included in the switching modules 30a and 30b) using switching signals 40a and 40b, respectively.

The device 10 receives AC power from a power source 44 (e.g., a wall mounted AC power socket, a universal power supply (UPS), and/or the like) that is coupled to the device 10. In an embodiment, the switching module 30a receives the AC power, and selectively transmits the AC power (e.g., based on a state of the switching signal 40a received from the power control module 22) to the AC to DC converter module 34. The AC to DC converter module 34 converts the AC power to DC power, which is received by the switching module 30b. The switching module 30b selectively transmits the DC power (e.g., based on a state of the switching signal 40b received from the power control module 22) to the component 26 and/or the components 46a, . . . , 46N.

The component 26 is an appropriate component of the device 10, which selectively receives power from the host 14 and/or from the power source 44. For example, the component 26 is a print controller, a print formatter, and/or the like. The components 46a, . . . , 46N selectively receive power from the power source 44. The components 46a, . . . , 46N include one or more of, for example, a printing module, a scanning module, an ink deposition module, an image processing module, a data processing module, a memory module, and/or the like. Although not illustrated in FIG. 1, the communication interface module 38 also receives power from one or both of the host 14 and the power source 44.

Thus, the component 26 receives one or both of (i) power from the host 14 via the link 18 and (ii) power from the power source 44 via the AC to DC converter module 34. Although FIG. 1 illustrates only one component (i.e., component 26) receiving power from the host 14 via the link 18, in an embodiment (and not illustrated in FIG. 1), more than one component (e.g., one or more of the components 46a, . . . , 46N) may also receive power from the host 14 via the link 18 (e.g., in addition to, or instead of receiving power from the power source 44).

In an embodiment, the device 10 operates in one of a plurality of modes of operation. For example, during a standard power mode of operation (henceforth referred to as a "standard power mode"), the device 10 performs a print operation, a scan operation, a copy operation, a fax operation and/or any other appropriate operation (e.g., communicate with the host 14), and/or is ready to perform one or more of these operations. During the standard power mode, various components of the device 10 are fully powered. In an example, the standard power mode is akin to a wake up state of the device 10.

During the standard power mode, the switching modules 30a and 30b are switched on, and the component 26 and various other components of the device 10 (e.g., components 46a, . . . , 46N) receive power from the power source 44 through the AC to DC converter module 34. In an embodiment, in addition to or instead of receiving power from the power source 44, during the standard power mode the component 26 receives power from the host 14. In another embodiment, during the standard power mode the component 26 does not receive and/or use power from the host 14. For example, during the standard power mode the power control module 22 refrains from transmitting power, which is received from the host 14, to the component 26.

In an embodiment, the device 10 also operates in a low power mode of operation (henceforth referred to as a "low power mode"). For example, when the device 10 is not used for at least a threshold period of time, the device 10 enters the low power mode. In an example, the low power mode is akin to a sleep state of the device 10.

In an embodiment, relatively less power is required to operate the device 10 during the low power mode (e.g., compared to the power required by the device 10 during the standard power mode). For example, during the low power mode, the components 46a, . . . , 46N do not need to be powered. In an embodiment, a power requirement of the component 26 during the low power mode is relatively less compared to a power requirement of the component 26 during the standard power mode. For example, power received from the host 14 via the link 18 is sufficient to power the device 10, e.g., the component 26, during the low power mode. Accordingly, while in the low power mode, the component 26 receives power from the host 14 through the link 18. While in the low power mode, the power control module 22 switches off the switching modules 30a and/or 30b using the switching signals 40a and/or 40b. Accordingly, the components 26, 46a, . . . , 46N do not receive any power from the power source 44.

In an embodiment, the device 10 selectively operates in a first off state of operation (henceforth referred to as a "first off state") and/or a second off state of operation (henceforth referred to as a "second off state"). For example, during the first off state, the power source 44 is switched off, is disconnected from the device 10, and/or the device 10 is manually switched off by a user of the device 10. During the first off state, none of the components 26, 46a, . . . , 46N receives power from the power source 44. Accordingly, in an embodiment, while in the first off state, even if the device 10 is coupled to the host 14 via the link 18 (and the host 14 is switched on, so that the USB and/or Ethernet port in the host 14 is ready to supply power to the device 10 via the link 18), there would not be any use to power the component 26 using power from the host 14 (as, during the first off state, no power from the power source 44 is available to carry out regular or standard operations of the device 10, if needed). Accordingly, in an embodiment, during the first off state, power from the host 14 is not used to power the component 26. However, in another embodiment, during the first off state, power from the host 14 is used to power the component 26, e.g., so that the component 26 can perform some basic operations, e.g., saving print jobs received from the host 14 in a memory of the device 10, for printing in the future.

During the second off state, the power source 44 is switched on and is connected to the device 10, but power is not available from the host 14 via the link 18. Power may not be available via the link 18 for a variety of reasons, e.g., the host 14 is switched off; the USB and/or the Ethernet port in the host 14, to which the link 18 is coupled, is not in operation for any reason; the link 18 is decoupled from the host 14 and/or the device 10, and/or the like. In an embodiment, loss of available power via the link 18 indicates a non-operational state of the link 18, for example, for one or more of the above discussed reasons.

In an embodiment, while in the second off state, as the link 18 is not operational, the device 10 cannot communicate with the host 14. Accordingly, while in the second off state, the device 10 cannot receive, for example, a print command, a scan command, a fax command, and/or any other instructions from the host 14 via the link 18. Hence, in the second off state, there may not be any need to power the various components (e.g., components 26, 46a, . . . , 46N) using power from the power source 44. Accordingly, in an embodiment, while in the second off state, the power control module 22 also switches off the switching module 30a and/or 30b, and the components 26, 46a, . . . , 46N do not receive power from the power source 44.

However, in another embodiment, while in the second off state, the power control module 22 refrains from switching off the switching module 30a and/or 30b, and the components 26, 46a, . . . , 46N continue receiving power from the power source 44. For example, in such an embodiment, the components 26a, 46a, . . . , 46N may receive a print job from another host to which the device 10 is coupled (although such coupling is not illustrated in FIG. 1) and/or from the host 14 via another link (e.g., a wireless link, although such a link is not illustrated in FIG. 1).

In yet another embodiment, while in the second off state, the components 26, 46a, . . . , 46N continue receiving power from the power source 44 for at least a first period of time, and the components 26, 46a, . . . , 46N do not receive power from the power source 44 for a second period of time. As an example, the host 14 communicates with the device 10 via the link 18, and transmits a print job to the device 10 via the link 18. The device 10 stores the print job in a memory (not illustrated in FIG. 1) included in the device 10 and starts printing. However, after the host 10 transmits the print job to the device 10, the link 18 becomes non-operational (e.g., due to a user of the host 14 switching off the host 14), and power is not available from the host 14 via the link 18 (i.e., the device 10 enters the second off state, and the device 10 ceases receiving power from the host 14 via the link 18). Subsequent to entering the second off state, the components 26, 46a, . . . , 46N are powered by the power source 44 for the first period of time, during which the device 10 completes the print job. Once the device 10 completes the print job, no new print job may be received by the device 10 while in the second off state (as the link 18 is non-operational). Accordingly, after the device 10 completes the print job, the power control module 22 switches off the switching modules 30a and/or 30b, so that power from the power source 44 is not received by the components 26, 46a, . . . , 46N.

Once the link 18 becomes operational again after an end of the second off state (i.e., power is received via the link 18), the device 10 enters one of the previously discussed standard power mode and the low power mode based on, for example, communication between the host 14 and the device 10 via the link 18. In an example, the device 10 entered the second off state due to a switching off of the host 14. Once the host 14 is switched on (i.e., power is available from the host 14 via the link 18 and the second off state ends), the device 10 enters the low power mode and is ready to enter the standard power mode whenever, for example, print jobs are available from the host 14 to the device 10 via the link 18.

Although various embodiments discussed herein are directed towards a printing device 10, various other embodiments may also be are directed towards other types of electronic devices—e.g., an image translation device that may or may not have printing capabilities (e.g., directed towards a fax machine, a scanner, a copier, a multifunctional printer, and/or the like).

Although two switching modules (i.e., switching modules 30a and 30b) are illustrated in FIG. 1, in an embodiment, the device 10 includes only one of the switching modules 30a and 30b. Although not illustrated in FIG. 1, in an embodiment, the AC to DC converter module 34 is external to the device 10 (e.g., the AC to DC converter module 34 is an adapter that supplies DC power to the device 10), and the power control module 22 controls the switching module 30b to selectively supply power from the power source 44 to the components 26, 46a, . . . , 46N (e.g., in such an embodiment, the switching module 30a is absent).

There are several advantages of using, by the device 10, power received from the host 14 via the link 18. For example, such usage of power from the host 14 ensures that, during the low power mode, no power is used from the power source 44. For example, during the low power mode, the switching modules 30a, 30b, the AC to DC converter module 34, and the components 46a, . . . , 46N of the device 10 can be completely switched off. In contrast, in a conventional printing device, an AC to DC converter remains switched on even during a low power mode, to supply power to one or more components of the conventional printing device. In the conventional printing device, during the low power mode, the AC to DC converter operates at a low load level, and an efficiency of the AC to DC converter decreases while operating at the low load level. On the other hand, as discussed, during the low power mode, the AC to DC converter module 34 of the device 10 can completely be switched off. Also, in the previously discussed second off state, when the link 18 is non-operational, power from the power source 44 is not used at all by the device 10. In contrast, in the conventional printer, when a link coupling the conventional printer to a host is non-operational, the conventional printer still is on, and possibly operates in a low power mode (e.g., the AC to DC converter of the conventional printer remains switched on). For at least these reasons, the device 10 is more power efficient compared to the conventional printer.

Figure 2:
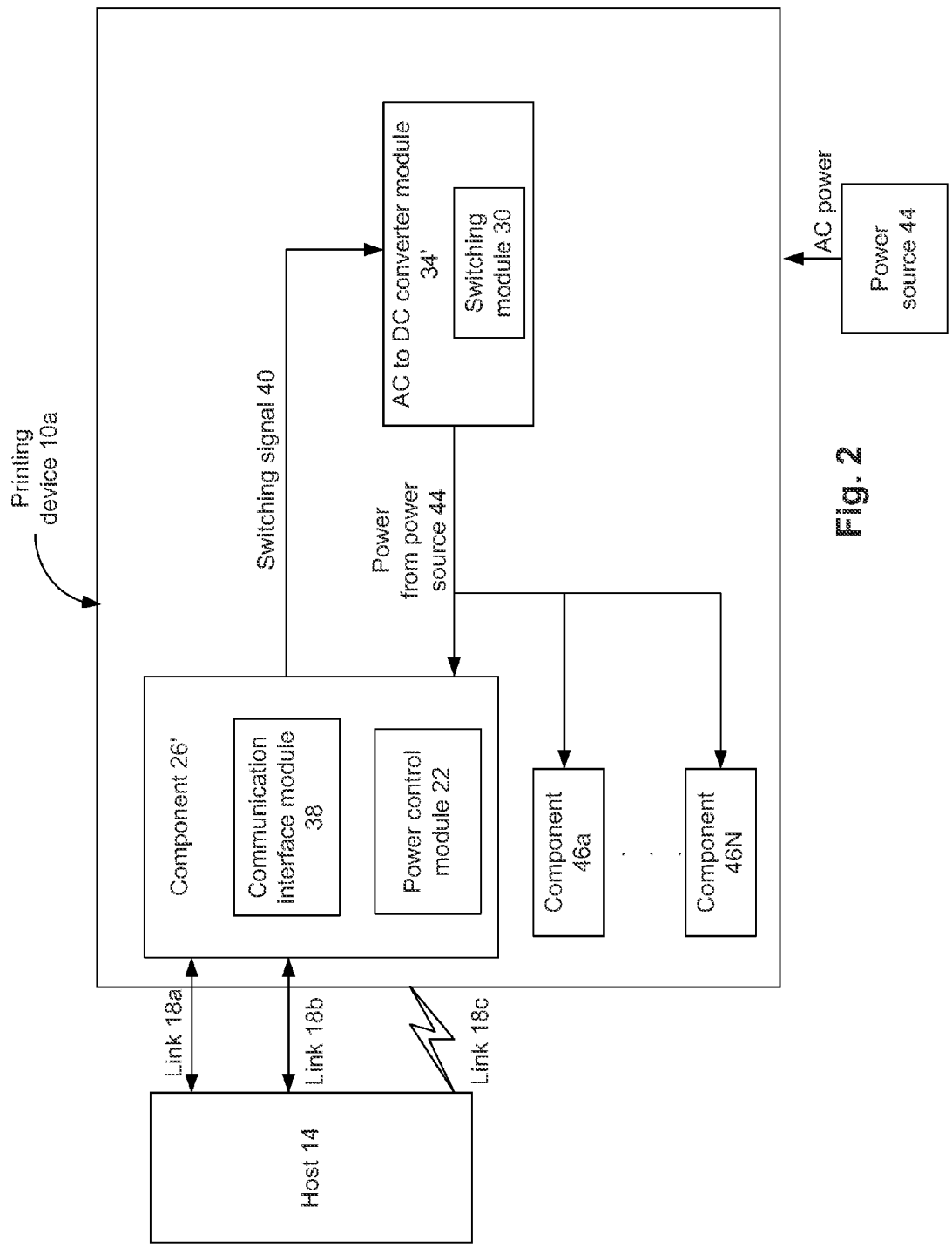
FIG. 2 schematically illustrates another example electronic device coupled to the host.

FIG. 2 schematically illustrates an example electronic device—e.g., a printing device 10a—coupled to the host 14. Various components of the printing device 10a (henceforth referred to as "device 10a") of FIG. 2 are in part similar to the corresponding components of the device 10 of FIG. 1, and accordingly, some of the components of the devices 10 and 10a are labeled using similar labels.

Unlike the device 10, the device 10a of FIG. 2 is coupled to the host 14 via links 18a, 18b and 18c. In an embodiment, the links 18a and/or 18b are similar to the link 18 of FIG. 1. For example, the links 18a, 18b comprise a USB link and an Ethernet link, respectively. The link 18c is a wireless link for communication between the host 14 and device 10. In an embodiment, the device 10 receives power from the host 14 via the link 18a and/or the link 18b. Although three links are illustrated in FIG. 2, in an embodiment, the device 10a is coupled to the host 14 using any appropriate number of links (e.g., including at least one link that provides power from the host 14 to the device 10).

In an embodiment, unlike the device 10, in the device 10a of FIG. 2, the communication interface 38 and the power control module 38 are integrated in a component 26'. Similar to the component 26, the component 26' selectively receives power from the host 14 and/or the power source 44, e.g., based on a mode of operation of the device 10a. In an embodiment, instead of two switching modules 30a and 30b of FIG. 1, the device 10a includes a single switching module 30. In an embodiment, the switching module 30 of FIG. 2 is integrated in an AC to DC converter module 34', although in another embodiment the switching module 30 is external to the AC to DC converter module 34' (although not illustrated in FIG. 2). The power control module 22 of the device 10a controls the switching module 30 via a switching signal 40, e.g., based on a mode of operation of the device 10a. In an embodiment, the device 10a operates in a manner that is in part similar to the previously discussed operation of the device 10.

Figure 3:
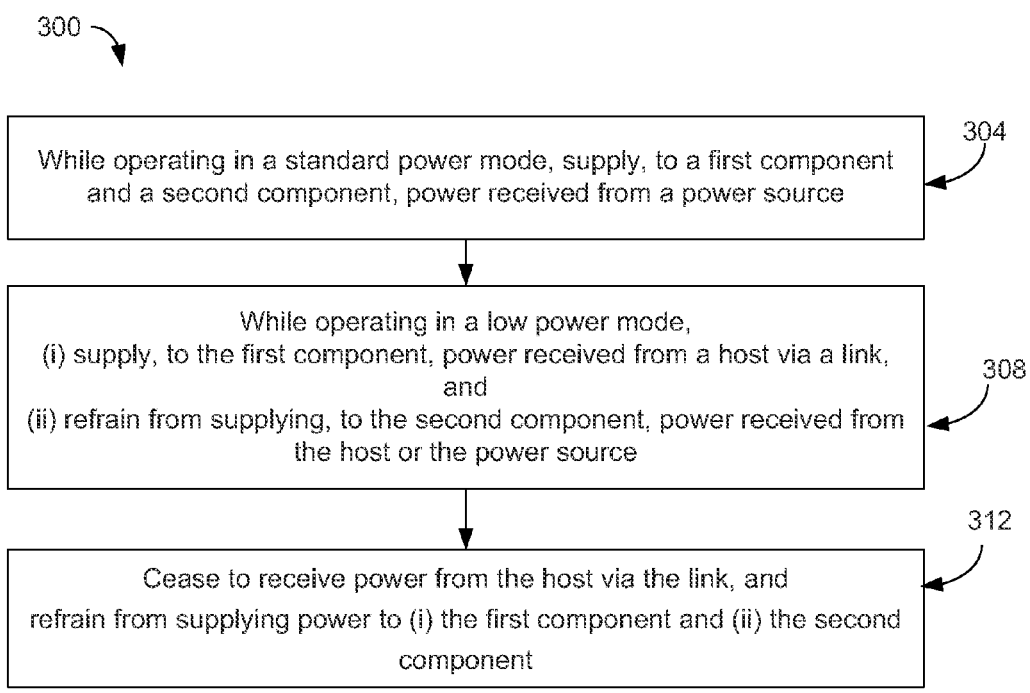
FIG. 3 illustrates an example of a method for operating an electronic device.

FIG. 3 illustrates an example of a method 300 for operating an electronic device (e.g., printing devices 10 and/or 10a of FIGS. 1 and 2). At 304, the electronic device operates in a standard power mode. While operating in the standard power mode, power, received from a power source (e.g., power source 44), is supplied to a first component (e.g., component 26 of FIG. 1) and a second component (e.g., component 46a of FIG. 1). Although not illustrated in FIG. 3, in an embodiment, in the standard power mode, power received from a host (e.g., host 14) via a link (e.g., link 18) may also be supplied to the first component.

At 308, the electronic device operates in a low power mode. In the low power mode, power received from the host via the link is supplied to the first component. Also, in the low power mode, the electronic device (e.g., the power control module 22) refrains from supplying, to the second component, power received from the power source.

At 312, the electronic device ceases receiving power from the host via the link, i.e., enters the previously discussed second off state. In response to ceasing to receive power from the host via the link, the electronic device refrains from supplying power to (i) the first component and (ii) the second component.

Various operations discussed with respect to the method 300 may not occur in the order in which the operations are illustrated in FIG. 3. For example, the operations at 312 (associated with ceasing to receive power from the host) may occur prior to the operations at 308 (associated with operating in the low power mode).

In accordance with an embodiment, an article of manufacture may be provided that includes a storage medium having instructions stored thereon that, if executed, result in the operations described herein with respect to the method 300 of FIG. 3 (and/or various other operations discussed in the present disclosure). In an embodiment, the instructions, if executed, result in the operations performed by an electronic device (e.g., the printing devices 10 and/or 10a of FIGS. 1 and/or 2). In an embodiment, the storage medium comprises some type of non-transitory memory (not shown). In accordance with various embodiments, the article of manufacture may be a computer-readable medium such as, for example, software or firmware.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description may use the terms "embodiment" or "embodiments," which may each refer to one or more of the same or different embodiments. Furthermore, the terms "comprising," "including," "having," and the like, as used with respect to embodiments, are synonymous.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A method comprising:
using a link to couple an electronic device to a host, wherein the electronic device includes a memory and is operable in at least one of (i) a first mode of operation, (ii) a second mode of operation, and (iii) a third mode of operation;
while the electronic device is operating in the first mode of operation, supplying, to a first component of the electronic device, power received from a power source, wherein power from the power source is converted from alternating current (AC) power to direct current (DC) power via a converter, prior to the power being selectively supplied to a plurality of components of the electronic device;
while the electronic device is operating in the second mode of operation, (i) supplying, to the first component of the electronic device, power received from the host via the link, and (ii) not supplying, to the first component of the electronic device, power received from the power source;
in response to the electronic device ceasing to receive power from the host over the link due to one or more of (i) the link developing a fault and (ii) the link being decoupled from one or both of the host and the electronic device,
using power received from the power source, completing, by the electronic device, a task that was previously assigned to the electronic device from the host, and
subsequent to the electronic device completing the task, operating, by the electronic device, in the third mode of operation by switching off the converter, thereby refraining from supplying power to any component of the electronic device.

2. The method of claim 1, further comprising:
while the electronic device is operating in the second mode of operation, refraining from supplying, to a second component of the electronic device, power received from the power source.

3. The method of claim 1, wherein the third mode of operation comprises a mode of operation in which the electronic device is powered off.

4. The method of claim 1, wherein the first mode of operation is a standard power mode of operation, and the second mode of operation is a low power mode of operation, and wherein the method further comprises:
while the electronic device is operating in the first mode of operation, having the electronic device remain idle for at least a predetermined period of time; and
in response to the electronic device remaining idle for at least the predetermined period of time, having the electronic device enter the second mode of operation.

5. The method of claim 1, wherein the electronic device communicates with the host via the link.

6. The method of claim 1, wherein the link is one of a Universal Serial Bus (USB) link and an Ethernet link.

7. The method of claim 1, wherein the electronic device is one of a printing device, a scanning device, a faxing device, and a multifunction printer.

8. The method of claim 1, further comprising:
   in response to the electronic device (i) detecting the loss of power from the power source and (ii) continuing to receive power from the host via the link,
      supplying, to the first component of the electronic device, power received from the host via the link, to enable the first component to save, in the memory of the electronic device, data received from the host by the electronic device via the link.

\* \* \* \* \*